United States Patent [19]

Husband et al.

[11] 4,063,835

[45] Dec. 20, 1977

[54] FRAME CONSTRUCTION

[75] Inventors: Wallace T. Husband, West Vancouver; Howard A. Larlee, Surrey, both of Canada

[73] Assignee: E-Z Rect-Metal Products Ltd., North Vancouver, Canada

[21] Appl. No.: 762,973

[22] Filed: Jan. 27, 1977

[51] Int. Cl.² ............................ F16B 7/22; F16B 9/02
[52] U.S. Cl. ..................... 403/252; 403/316; 211/192
[58] Field of Search ............... 403/252, 254, 231, 316, 403/315; 211/192, 208; 248/224.1–224.4, 243; 108/108, 152

[56] References Cited

U.S. PATENT DOCUMENTS

| 2,703,635 | 3/1955 | Carlson | 403/231 |
| 3,146,864 | 9/1964 | Nystrom et al. | 403/231 X |
| 3,315,996 | 4/1967 | Sedo | 403/252 |

FOREIGN PATENT DOCUMENTS

| 809,243 | 2/1959 | United Kingdom | 248/243 |

*Primary Examiner*—Wayne L. Shedd
*Attorney, Agent, or Firm*—Fetherstonhaugh & Co.

[57] ABSTRACT

A framework is constructed using posts having side walls in which vertically aligned and spaced-apart slots are formed. The posts support frame members having end edges which abut the side wall. A pair of hooks on the end edge enter into a pair of slots and, when the frame members are moved relative to one another, the hooks engage the side wall and the end edge is clamped to that wall. The end edges have locking tabs which are bent into a slot to prevent disengagement of the frame members.

8 Claims, 6 Drawing Figures

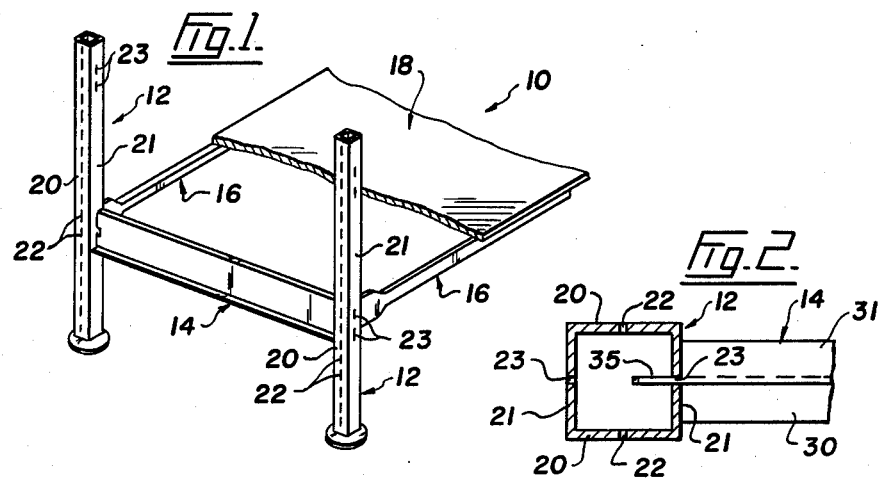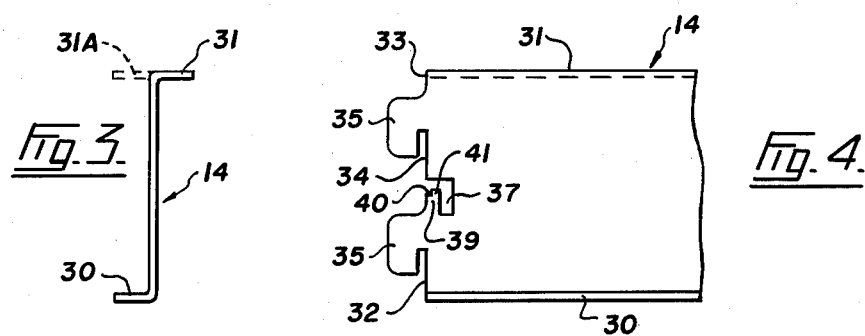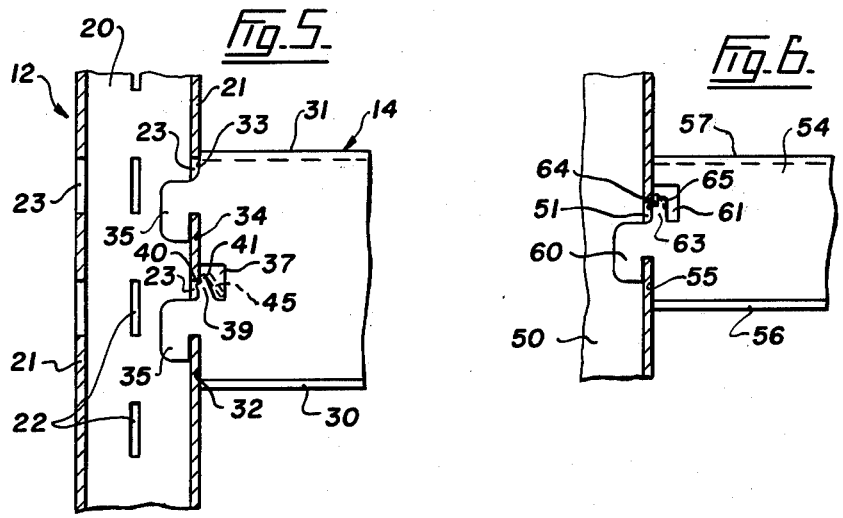

FRAME CONSTRUCTION

This invention relates generally to improved construction for prefabricated frames and more particularly to means for securing one frame member to another.

It is not uncommon to prefabricate the parts needed to construct shelves in a warehouse, or a work bench in a home or shop, so that the parts can be ordered from the factory for assembly at the site. This type of construction allows a variety of shelves and benches to be built since the parts are very easy to assemble and no special skill or tools are required. The types of prefabrication needed to ensure ease of assembly, however, will sometimes result in a framework which is not as rigid as desired and it is possible for one assembled frame member to be accidentally dislodged from another which might result in a partial collapse of at least a section of a heavily-loaded bench or length of shelving.

The present frame construction is as readily assembled as before but the resulting structure is particularly rigid with the frame parts being locked together against accidental dislodgement. More specifically, frame construction according to the present invention comprises a first frame member having a side wall provided with a slot, a second frame member having an end edge, a hook on the end edge enterable through the slot to engage the side wall, said second frame member having a locking tab at the end edge, said locking tab being bendable into the slot to prevent disengagement of the hook from the side wall.

In drawings which illustrate preferred embodiments of the invention,

FIG. 1 is a perspective view of a portion of the present frame construction,

FIG. 2 is a horizontal section of a post of the frame and showing a horizontal frame member connected thereto, FIG. 3 is an end elevation of the horizontal frame member, FIG. 4 is a side elevation of one end of the horizontal frame member, FIG. 5 is a vertical section, part in elevation, showing the connection between a post and the horizontal frame member, and FIG. 6 is a view similar to FIG. 5 and showing a modification of the invention.

Referring to the drawings, there is shown in FIG. 1, an end portion of a typical frame 10 used in the construction of shelving and work benches, as well as other structures. The numerous prefabricated parts of the frame construction are intended to be erected to form shelves in a warehouse, for example, and those parts include such frame members as posts 12 and cross members 14 as well as longitudinal members 16 which carry shelves 18.

In this type of knock-down shelving, the posts 12 are hollow and may be rectangular in cross section but preferably are square in cross section as shown best in FIG. 2. Either cross sectional shape provides the post with opposing side walls 20 and similarly arranged side walls 21. The walls 20 of the tubular posts are commonly provided with a row of vertically aligned slots 22, see particularly FIGS. 1, 2 and 5. The posts 12 of the present frame construction are additionally provided on the side walls 21 with rectangular slots 23 arranged in vertically aligned pairs.

The horizontal members 14 are each formed from sheet metal to provide bottom and top flanges 30 and 31. These flanges are disposed at right angles to the remainder of the member and preferably the flanges project in the opposite directions as shown best in FIG. 3. Alternatively, the members 14 each have a flange 31A which is indicated by dotted lines in FIG. 3 and this projects in the same direction as the flange 30 so that the member appears in cross section to be a flattened channel. Flanges 30 and 31 have end edges 32 and 33, see particularly FIGS. 3 and 4.

In FIG. 4, each opposite end edge 34 of a cross member 14 will be seen to be stamped or otherwise shaped to provide two forwardly and downwardly projecting hooks 35. Between these hooks, the edge 34 has an inwardly extending and downwardly turned opening 37 located alongside a locking tab 39. The tab 39 which is integral part of member 14 is stepped on the uppermost end thereof to provide an outer shoulder 40 and an inner head 41.

Referring now particularly to FIG. 5, one end of a cross member 14 is shown connected to a post 12 by means of the above described hook and slot arrangement. This is accomplished by threading the hooks 35 through the slots 23 until the end edge 34 abuts the outer face of a wall 21 of the post. A member 14 is then pushed downwardly so that the hooks snugly engage the inner face of the side wall immediately below the slots, and the end edge 34 of the member is clamped tightly to the outer face of the wall as are the corresponding end edges 32 and 33 of the flanges 30 and 31.

At this time, the locking tab 39 is bent from the normal vertical position shown at FIG. 4 to the outwardly inclined position shown in FIG. 5. Preferably, this is down using a screwdriver and a tip 45 of the blade of this tool is represented by dotted lines in FIG. 5. The blade tip 45 is positioned in the opening 37 so as to bear against the inner side edge of the tab 39 whereupon the screwdriver is twisted to bend the tab towards the adjacent wall 21 of the post, the tab remaining in the same vertical plane of the member 14. This bending of the tab places the shoulder 40 beneath a top edge of the slot and the head 41 against the outer face of the wall 21 of the post. The cross member 14 then cannot be raised upwardly as must be down before the hooks 35 can be disengaged from the wall. Thus, the frame members 12 and 14 are firmly locked together. Since the end edges of the flanges 30 and 31 are also clamped to the side wall of the post, a cross member cannot swing in either direction relative to the post and in a horizontal plane which adds to the rigidity of the frame construction. In the case where the member 14 has the flanges 30 and 30A projecting in the same direction, those flanges brace against movement of the member in one direction only which may be all that is required in some shelving.

Referring to the embodiment of the invention shown in FIG. 6, the numeral 50 indicates a post having a rectangular slot 51. Cross member 54 has an end edge 55, a bottom flange 56 and a top flange 57. The end edge 55 is provided with a single hook 60 and an opening 61. A locking tab 63 partially blocks the opening 61 and this tab has a shoulder 64 and a head 65.

The post 50 and frame member 54 are connected together and interlocked as previously described. Again the several parts of the two frame members 50 and 54 are interengaged and clamped together in such a manner that the resulting frame is rigid and the members cannot be separated unless the locking tabs are bent back to their original upright positions.

From the foregoing, it will be apparent the present frame construction has parts which can be quickly and easily assembled without the need for additional fasteners or special tools other than a screwdriver. The assembly can be locked against accidental dislodgement of the two major structural parts and the construction is firmly braced against side sway. If it ever becomes necessary to dismantle the shelving, for example so that it can be reassembled elsewhere, the locking tabs can be bent out of engagement with the posts and normally this is done by wedging the tip of a screwdriver between the head of the tab and the outer face of the post.

I claim:

1. Frame construction comprising a first frame member having a side wall provided with a slot, a second frame member having an end edge, a hook on the end edge enterable through the slot to engage the side wall, said second frame member having an integral and coplanar locking tab at the end edge, said locking tab being bendable away from and substantially coplanar with the second frame member into the slot to prevent disengagement of the hook from the side wall.

2. Frame construction as claimed in claim 1, in which said second frame member has an opening extending into the end edge alongside the locking tab whereby said tab is bendable by a tool entered into said opening to move coplanar with the second frame member into a locking position with respect to the first frame member.

3. Frame construction as claimed in claim 2, in which said locking tab has a shoulder and a head on an upper end thereof, said shoulder entering beneath an upper edge of the slot and said head engaging the side wall when the locking tab is bent into the locking position.

4. Frame construction as claimed in claim 1, in which said second frame member has bottom and top flanges at right angles to said member, said flanges having end edges engaging an outer face the side wall when the hook is in engagement with an inner face of said side wall.

5. Frame construction comprising a tubular post having a side wall, said side wall having a pair of vertically aligned and spaced-apart slots, a horizontal frame member having an end edge engageable with the side wall, a pair of longitudinally projecting hooks on the end edge enterable into the pair of slots and being movable downwardly to engage lower edges of said slots, said horizontal frame member being shaped at the end edge to provide an integral locking tab and an adjoining opening, said locking tab being bendable into one of the pair of slots to engage an upper edge of said one slot and resist upward movement of the horizontal frame member.

6. Frame construction as claimed in claim 5, in which said locking tab has an outer shoulder and an inner head, said shoulder engaging an upper end edge of said one slot of the pair of slots and said head bearing against the side wall to limit outward bending movement of the locking tab.

7. Frame construction as claimed in claim 5, in which said horizontal frame member has a bottom flange projecting laterally in one direction and a top flange projecting laterally in an opposite direction, said bottom and top flanges having end edges engaging the side wall of the tubular post to resist relative movement between said post and the horizontal frame member.

8. Frame construction as claimed in claim 5, in which said horizontal frame member has top and bottom flanges projecting laterally in the same direction and each having an end edge engaging the side wall of the tubular post to resist relative movement between said post and the horizontal frame member.

* * * * *